United States Patent
Bargury et al.

(10) Patent No.: US 10,848,463 B2
(45) Date of Patent: Nov. 24, 2020

(54) LISTEN MODE FOR MACHINE WHITELISTING MECHANISMS

(71) Applicant: MICROSOFT TECHNOLOGY LICENSING, LLC, Redmond, WA (US)

(72) Inventors: Michael Zeev Bargury, Ramat-Gan (IL); Yotam Livny, Gadera (IL); Moshe Israel, Ramat-Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 223 days.

(21) Appl. No.: 16/053,996

(22) Filed: Aug. 3, 2018

(65) Prior Publication Data
US 2020/0045018 A1 Feb. 6, 2020

(51) Int. Cl.
*H04L 29/06* (2006.01)
*G06F 11/34* (2006.01)
(Continued)

(52) U.S. Cl.
CPC ...... *H04L 63/0263* (2013.01); *G06F 11/3409* (2013.01); *G06F 21/52* (2013.01);
(Continued)

(58) Field of Classification Search
CPC ... H04L 63/0263; H04L 63/20; H04L 63/101; H04L 63/102; H04L 41/0813;
(Continued)

(56) References Cited

U.S. PATENT DOCUMENTS

| 2013/0139247 A1* | 5/2013 | Cianfrocca | H04L 63/0245 726/14 |
| 2014/0245376 A1* | 8/2014 | Hibbert | H04L 63/20 726/1 |

(Continued)

OTHER PUBLICATIONS

Bugiel et al., Towards a Framework for Android Security Modules: Extending SE Android Type Enforcement to Android Middleware, Feb. 20, 2013, Intel Collaborative Research Institute for Secure Computing, Technical Report Nr. TUD-CS-2012-0231, pp. 1-35. (Year: 2013).*

(Continued)

*Primary Examiner* — Nelson S. Giddins
(74) *Attorney, Agent, or Firm* — Workman Nydegger

(57) ABSTRACT

Control policies are configured to automatically update a whitelist and to permit an application, including its associated computing operations, to execute on the computer system. After the application is installed, initialization and execution of the application is triggered. Concurrently, the application's computing operations are recorded and certain control policies, such as a firewall, are paused from being enforced. The recorded computing operations are classified into at least two different categories, where one category includes computing operations associated with the application and where another category includes computing operations that are not associated with the application but that occurred while the application was running. The first category computing operations are then whitelisted so that they are identified as being permissible computing operations by the control policies. Thereafter, the control policies are again enforced thus allowing the application, including its associated computing operations, to execute without being interrupted by the control policies.

20 Claims, 16 Drawing Sheets

(51) Int. Cl.
  *G06F 21/52* (2013.01)
  *H04L 12/24* (2006.01)
  *G06N 20/00* (2019.01)

(52) U.S. Cl.
  CPC ........ *H04L 41/0813* (2013.01); *H04L 63/101* (2013.01); *H04L 63/20* (2013.01); *G06N 20/00* (2019.01)

(58) Field of Classification Search
  CPC ..... G06F 21/52; G06F 11/3409; G06N 20/00; H04W 12/08
  See application file for complete search history.

(56) References Cited

U.S. PATENT DOCUMENTS

2017/0093918 A1* 3/2017 Banerjee ............... H04L 63/101
2018/0191738 A1* 7/2018 David ................... H04L 63/145

OTHER PUBLICATIONS

Bugiel, et al., "Towards a Framework for Android Security Modules: Extending SE Android Type Enforcement to Android Middleware", In Proceedings of Intel Collaborative Research Institute for Secure Computing, Dec. 5, 2012, 34 Pages.

"International Search Report and Written Opinion Issued in PCT Application No. PCT/US19/039638", dated 11 Pages.

* cited by examiner

LISTEN MODE FOR MACHINE WHITELISTING MECHANISMS

BACKGROUND

Computers and related technology have impacted many aspects of society. Indeed, a computer's ability to process information and to execute applications has transformed the way people live and work.

A computer application operates by executing a set of executable instructions. These executable instructions (i.e. the computer application) can be engineered in a manner to cause the underlying computer to perform any number of desired operations, such as to execute games, provide email services, provide web development services, and countless other operations. Additionally, the execution of these instructions enables the computer to communicate and interact with other computers via a network connection (e.g., via a local area connection or via the Internet to communicate with computers operating in a cloud environment).

Often, an application control policy (e.g., a firewall), which is a type of security construct, is used to control how a computer operates and to help protect that computer from malicious entities. A firewall controls the computer's operations by imposing predetermined security rules (i.e. configuration policy). For example, the firewall may control the incoming and outgoing network traffic, the computer's threads, or any other operations of the computer. The use of a firewall has significantly improved how computers are safeguarded, especially with ensuring that they do not become subject to hacking (e.g., malware, viruses, phishing, etc.).

Notwithstanding these benefits, the process of configuring a firewall to enable an application to properly execute on a computer has created many challenges and difficulties, particularly with regard to maintaining the firewall's policy and to ensuring that all of an application's associated computing operations are identified by the firewall as being permissible computing operations. It will be appreciated that if some of the application's computing operations (or even a single operation) are blocked by the firewall, then the application may not perform in the manner desired, thus leading to user frustration and computing inefficiency (e.g., having to expend computing resources to find and troubleshoot the error). Accordingly, there is a need to improve how an application control policy is configured in order to better ensure that the application control policy does not improperly restrict an application's computing operations when that application was originally identified as being an allowed/permitted application.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems and methods that automatically configure application control policies in order to permit an application, including its associated computing operations (e.g., its processes, tasks, threads, executables, libraries, dependencies, and other auxiliary associations), to execute on a computer system without obstruction from the application control policies.

In some embodiments, the application is initialized for execution. Simultaneously with the application's initialization and execution, an audit component records computing operations that occur while the application is being initialized and executed. Also simultaneously with the application's initialization and execution, a firewall executing on the same computer as the application is paused. This firewall is configured to block unallowed computing operations from running on the computer. To be considered unallowed, an operation is identified as failing to satisfy a configuration policy of the firewall. The recorded computing operations are classified into at least two categories. A first category includes computing operations that are identified/determined to be associated with the application's initialization and execution (i.e. these operations are the application's operations). A second category includes any other computing operations that are not associated with the application but that occurred concurrently with the application's initialization and execution (e.g., these could be, for example, background processes).

After this classification process, in some embodiments, the computing operations of the first category are whitelisted so that they are tagged as being "allowed" computing operations. In this regard, these first category computing operations will not be blocked by the firewall because they are identified as satisfying the firewall's configuration policy. In some embodiments, after the classification process occurs, policy data for the first category computing operations is incorporated into the firewall's configuration policy to thereby cause the firewall to permit the execution of the first category computing operations while the firewall is enforced.

In some embodiments, after installing an application on a computer system, the application is caused to execute on the computer system. While the application is running, the enforcement of one or more application control policies is paused. While the control policies are paused, the computer system continues to operate in an 'audit mode.' Any computing operations that are associated with the application are recorded during the audit mode. Thereafter, policy data for the application's associated computing operations is included into the application control policies such that the application's associated computing operations are identified as being "permissible" operations and are refrained from being blocked or otherwise obstructed during enforcement of the application control policies. After the inclusion of the policy data into the application control policy, the one or more application control policies are again enforced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
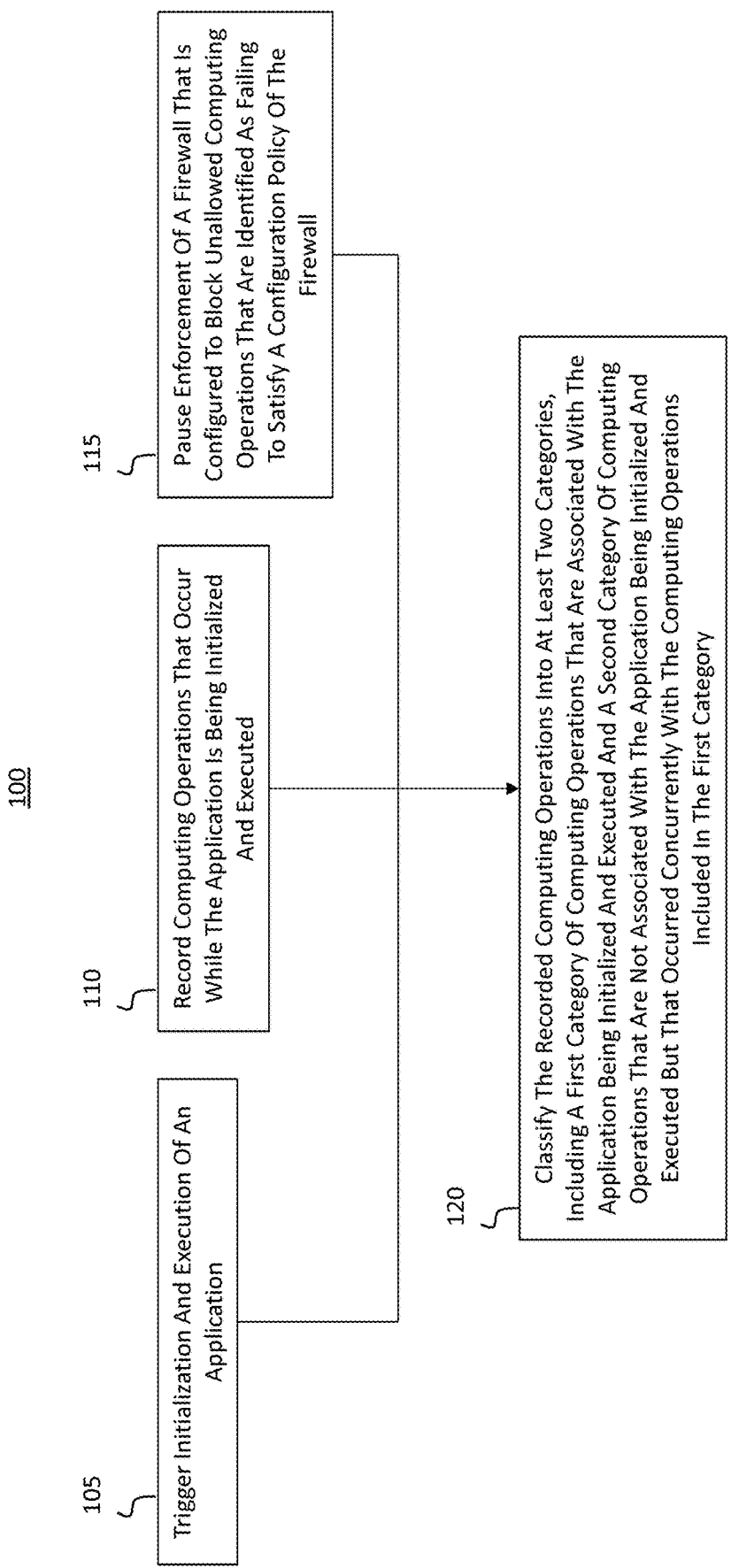
FIGS. 1A and 1B illustrate a flowchart of an example method for automatically configuring one or more application control policies to ensure that an application, including its associated computing operations, is permitted to execute on a computer system without being blocked by the application control policies.

The disclosed embodiments relate to systems and methods for automatically configuring a firewall or other type of application control policy in order to permit an application to execute on a computer system without being undesirably impeded by the firewall.

In some embodiments, during a time in which an application is initializing and/or executing, a number of different processes may occur. One process relates to recording computing operations that occur during this time period. Another process relates to pausing enforcement of a firewall during this time period. The recorded computing operations are then classified into at least two categories, where the first is for operations that are determined to be associated with the application while the second is for operations that are determined not to be associated with the application. Some embodiments then whitelist the first category operations using a tag so that those operations are not blocked by the firewall. Some embodiments also inject policy data into the firewall's configuration policy to thereby cause the firewall to permit those operations.

In some embodiments, the enforcement of an application control policy is paused when an application is running. Any computing operations that are identified as being associated with this application are then recorded. Policy data for these operations is then included in the application control policies to thereby identify those operations as being permissible. Therefore, when the application control policies are executed, they refrain from blocking these operations. After adding the policy data to the application control policies, the application control policies are again enforced.

In this regard, the disclosed embodiments can be used to provide solutions and benefits to the existing technology. For example, computers typically allow different layers of attack prevention by limiting use or access of certain unauthorized attempts. These traditional layers include, but are not limited to, (1) limiting network connections through a firewall configuration, (2) limiting access to files in the machine's file system, and/or (3) limiting applications that are allowed to run on the machine. By creating a 'whitelist' of authorized activities, the attack surface of the machine can be reduced significantly.

Previous attempts at configuring a firewall to permit applications to execute have resulted in systems that are difficult and laborious to configure, as described earlier. For instance, one downside with previous attempts is that the maintenance is hard. To update a firewall/application control policy, the user previously needed to (1) manually turn off the firewall, (2) install a new application, (3) understand what processes the new application is composed of, (4) update the firewall's policy with the hope that the administrator is not missing any of the application's processes (a situation that occurs quite often), and (5) turn the firewall back on. This process is highly frustrating and time consuming. It also results in an exorbitant number of configuration mistakes.

For instance, as described earlier, an application can be associated with a very large number of processes, threads, libraries, etc. There may be hundreds or even thousands of these auxiliary associations. If these auxiliary associations are not flagged as being permissible, then the computer's application control policies (also referred to herein as a "firewall") may block those auxiliary associations from being allowed to execute. This blocking may very well cause the application (which should be allowed to run) to not run or at least to not run as expected. As such, there is a substantial need to improve how application control policies are configured to ensure that an application's auxiliary associations are permitted to run. The disclosed embodiments, as briefly described above, are able to automatically identify an application's computing operations (e.g., the tasks, processes/threads, libraries, dependencies, executables, or any other auxiliary associations/operations that execute in order to allow the application to run) and to automatically configure the application control policies in a manner to ensure that these computing operations will be allowed to execute.

In this regard, the disclosed embodiments bring about many benefits to both a system administrator and to the underlying computer system. The disclosed embodiments are able to perform these operations automatically and in an intelligent manner (e.g., by accurately and precisely determining which computing operations are associated with which application) as will be described later. Additionally, the disclosed embodiments improve the efficiency of a computer system because, by correctly configuring the application control policies early, the likelihood of encountering an error later on will be reduced and less computing resources will be expended to resolve those errors. Accordingly, significant advantages may be realized through practice of the disclosed principles.

Techniques for Automatically Configuring Policy

Figure 1B:
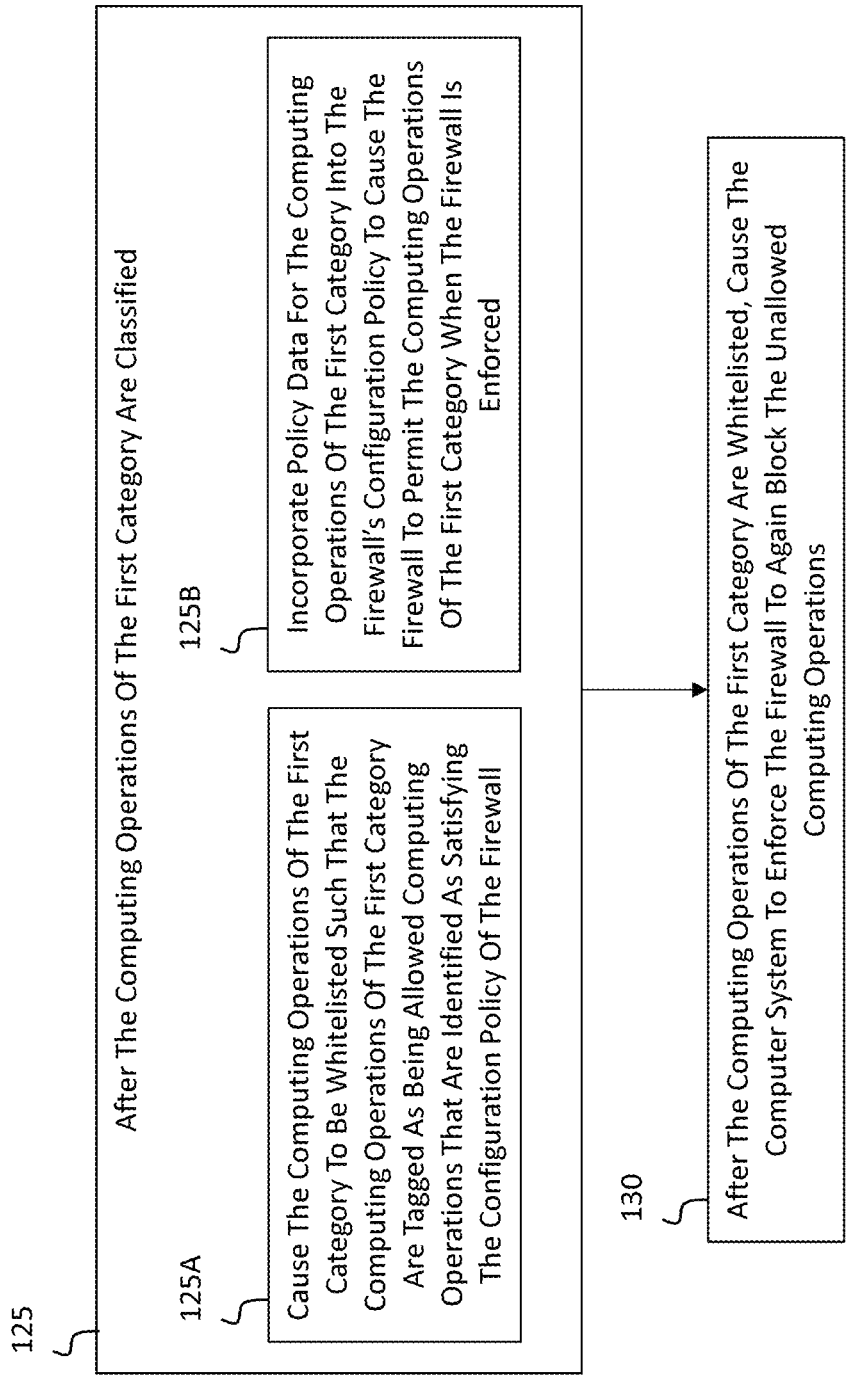
Figure 2:
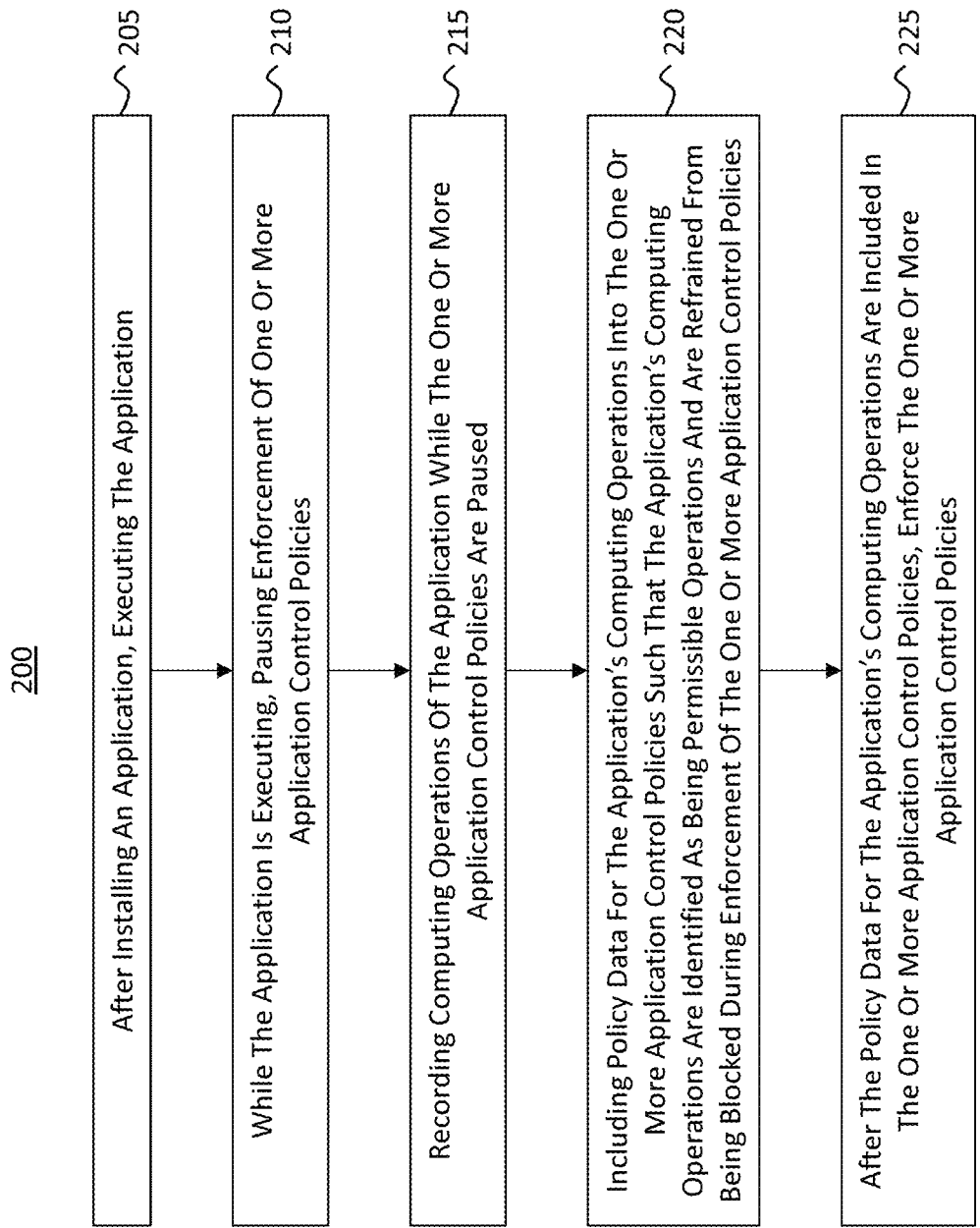
FIG. 2 illustrates another flowchart of an example method for configuring application control policies to ensure that an application will execute without obstruction from the application control policies.

FIGS. 1A, 1B, and 2 illustrate flowcharts of some example methods for automatically configuring policy. In this regard, the following discussion refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. Furthermore, these flowcharts are used to introduce the disclosed embodiments at a high level. Following the discussion of these flowcharts, additional descriptions, examples, and embodiments are provided in FIGS. 3 through 14 which more fully clarify the principles introduced in FIGS. 1A, 1B, and 2.

FIGS. 1A and 1B illustrate a flowchart of an example method 100 for configuring a firewall (i.e. "application control policy") to ensure that any computing operations that are determined to be associated with a permissible application will not be blocked when the firewall is enforced.

Acts 105, 110, and 115 are shown in parallel with one another. It will be appreciated, however, that this illustration should be interpreted to mean that these acts are not necessarily mutually dependent on one another, but that they can occur in parallel (or in serial) with one another.

Act 105 includes a process of triggering the initialization and execution of an application. The initialization can occur in any manner and should be interpreted broadly. For instance, initialization can occur by a user clicking on a desktop icon associated with the application. Clicking the application can cause the application to initialize by loading the application's configuration data into the computer's memory, such as RAM. The initialization can also occur automatically and without a human user's involvement. For instance, the initialization can be triggered upon the occurrence of one or more conditions (e.g., a time for a scheduled task is reached, one application invokes or otherwise calls another application, etc.) or it can occur for any other reason and at any other time. Once initialized, then the application will execute according to its engineered source code. The application can be a cloud-based application (such that it is initialized and executed in a cloud computing environment) or it can be a local application.

Concurrently/simultaneously with the initialization and execution of the application, computing operations that occurred while the application is being initialized and executed are recorded (act 110). For example, recording the computing operations includes reading the machine's activity, identifying computing operations for one or more software applications from within that activity, and then logging or otherwise recording those operations. As will be described later in connection with the computer system shown in FIG. 14, this process may be performed by an audit component. It will also be appreciated that many computing systems have multiple processors or cores which enable those computing system to perform any number of operations in parallel, including operations for multiple different applications. As such, the application recited above may not be the only application currently executing on the computer system. Therefore, the process described in act 110 includes recording any type of application computing operation, some of which may not be associated with the particular application of interest.

Concurrently with the initialization and execution of the application, an enforcement of a firewall is also paused (act 115), thereby putting the application/computer system into an audit mode. As will be described in more detail to follow, this firewall (i.e. application control policy) is configured to block "unallowed" computing operations. To be classified as an "unallowed" computing operation, the operation is identified as failing to satisfy a configuration policy of the firewall.

Thereafter, the recorded computing operations are classified into at least two categories (act 120). The first category includes computing operations that are associated with the application while it is being initialized and executed. Stated differently, these computing operations include the application's tasks, processes/threads, libraries, dependencies, executables, and any other auxiliary operations that occur in order to enable the application to perform its designed functionalities.

The second category of computing operations are those operations that are identified as not being associated with the application but that occurred concurrently with the computing operations of the first category. For instance, the computing operations in the second category may be for applications that were running in the background or those that were otherwise executing in parallel (via use of the multicore or multiple processors of the computer system) with the application of interest.

Consequently, this classification process is highly beneficial because it enables the system to segregate which computing operations correspond to which applications. One object of the disclosed embodiments is to enhance or otherwise improve the security mechanisms (e.g., the firewall) that are provided. To do so, the disclosed embodiments are configured to allow permitted applications, including their associated computing operations, to execute without obstruction from the firewall. The disclosed embodiments also operate to ensure that unpermitted applications are not permitted to operate when the firewall is actually being enforced. As such, it is highly beneficial to accurately segregate and distinguish the computing operations associated with one application (e.g., perhaps a permitted application) from another application (e.g., perhaps an application that may not be permitted when the firewall is enforced).

FIG. 1B shows some additional methods acts that are included in method 100. For instance, act 125 shows a number of alternative operations that may occur after the computing operations of the first category are classified.

In act 125A, the computing operations of the first category are "whitelisted." In some embodiments, the process of whitelisting one or more computing operations includes tagging those operations in some manner so that those operations are identified as being allowed/permissible computing operations. When tagged as being allowed, those operations are identified as satisfying the configuration policy of the firewall.

Tagging should be interpreted broadly to cover many different techniques. One example of tagging includes modifying metadata associated with those operations so that, when the metadata is inspected during enforcement of the firewall, the firewall is able to recognize that the computing operations are permitted. Another example of tagging includes modifying a database of configuration data to identify those computing operations as being allowed operations. Yet another example of tagging includes actually modifying the configuration policy data of the firewall to identify those operations as being permissible. Accordingly, when reference is made to "tagging" a computing operation, it is meant that the computing operation is identified as being an allowed/permissible operation such that the firewall will not block that operation.

Additionally, or alternatively to act 125A, in act 125B, policy data for the computing operations of the first category is incorporated into the firewall's configuration policy. This incorporation process causes the firewall to permit the computing operations of the first category when the firewall is enforced.

After the computing operations of the first category are identified/audited and whitelisted, the firewall is again enforced in order block any unallowed computing operations (act 130). It will be appreciated that because the whitelisted computing operations (i.e. the first category computing operations) were identified/audited as being permissible, the application, including its associated computing operations, will now be permitted to operate even when the firewall is enforced. Because this audit process is performed automatically, the disclosed embodiments significantly expedite the configuration process, especially when countless numbers of operations are present for the application.

FIG. 2 shows a flowchart of another example method 200 for automatically configuring application control policies to permit an application, including its associated computing operations, to execute on a computer system. After installing the application on the computer system, the application is caused to execute on the computer system (act 205).

While the application is executing, one or more application control policies (e.g., a "firewall" or rather the policies of the firewall) are paused from being enforced (act 210). During the time period in which the application control policies are paused, the application's associated computing operations are recorded (act 215).

Thereafter, policy data for the application's associated computing operations are included or injected into the one or more application control policies (act 220). By including the policy data into the application control policies, the application's associated computing operations are identified as being permissible operations. Additionally, these computing operations are refrained from being blocked during enforcement of the one or more application control policies.

After the policy data for the application's associated computing operations are included in the one or more application control policies, the one or more application control policies are again enforced (act 225).

Computing Operations and Auxiliary Associations of an Application

Figure 3:
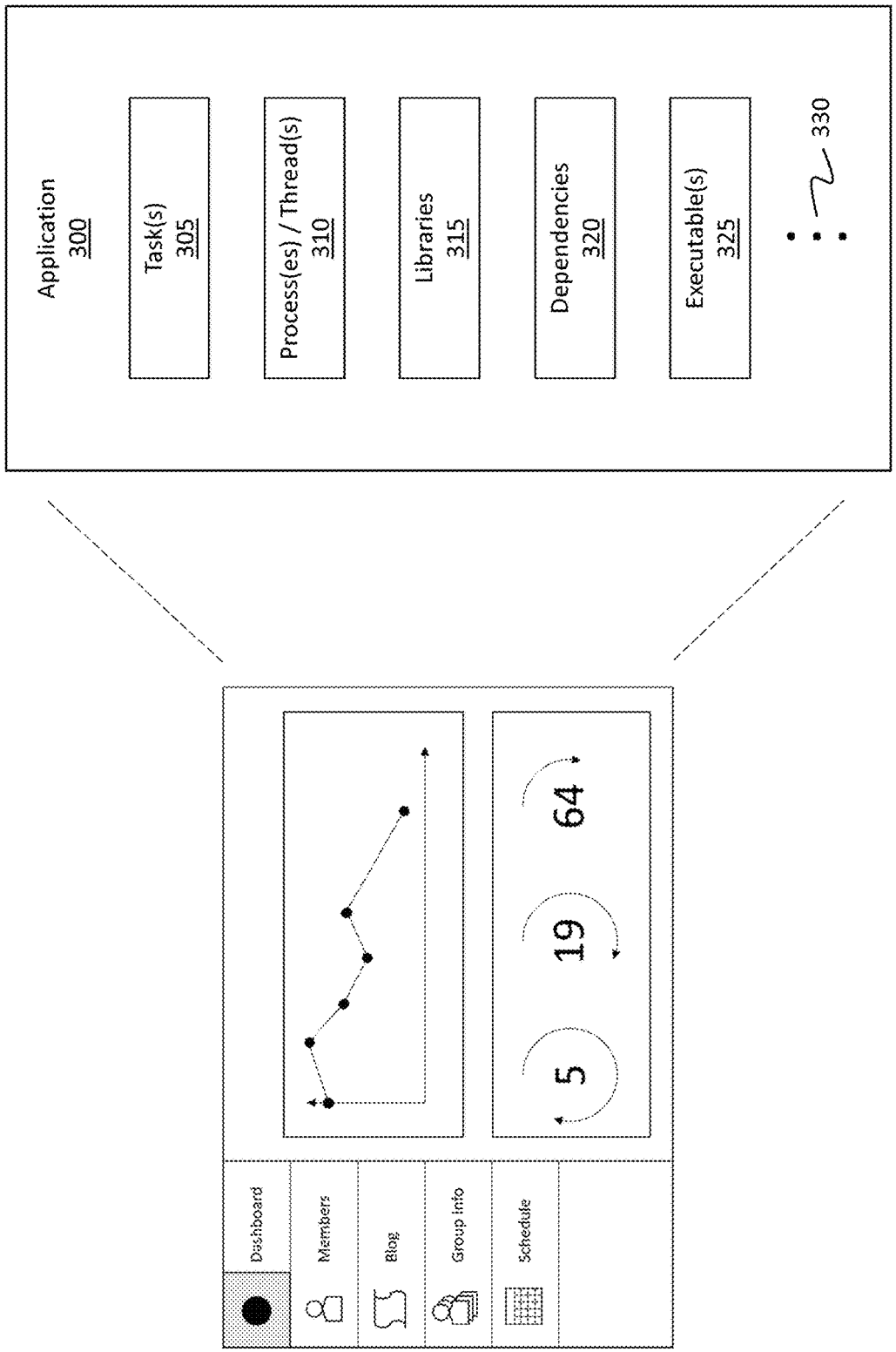
FIG. 3 illustrates how an application is often associated with any number of tasks, processes/threads, libraries, dependencies, and executables, among other things.

Attention will now be directed to FIG. 3 which shows some of the computing operations and other auxiliary associations of an application 300. Specifically, FIG. 3 shows that application 300 may be associated with any number of tasks 305, processes/threads 310, libraries 315, dependencies 320, and executables 325 (and user interfaces, as shown). The ellipsis 330 shows that other auxiliary associations may also be incorporated with application 300.

As used herein, tasks 305 refers to operations that are scheduled to be performed by an application in order to complete a desired function. In this regard, tasks 305 are units of work that can be scheduled to perform a specific objective. Relatedly, processes/threads 310, in some instances, refer to a representation of an executing (or suspended but still initiated) program that may have memory, registers, stack, counters, or other features of a control block. A process is able to run any number of threads, where any number of those threads can share memory. In this manner, processes/threads 310 correspond to single sequences of instruction that can operate in parallel with one another (e.g., by time-slicing or multi-processing). As such, processes/threads 310 are a mechanism used by application 300 is essentially "split" itself so that a larger number of work units can be completed simultaneously.

Libraries 315 refers to a collection of resources that are used by application 300 to ensure that the application operates. Examples of resources included within a library include, but are not limited to, code documentation, help resources, configuration data and files, code, subroutines, templates, and/or any other type of data that can be grouped together. Dependencies 320 refer to relationships that exist between a calling engine, module, or component, and a called engine, module, or component, where the relationship is used to perform a desired operation. Executables 325 refers to a compiled file that includes a program. Accordingly, from this discussion, it will be apparent that application 300 may be associated with hundreds, thousands, tens of thousands, or even millions of "computing operations" (a term used to collectively refer to the tasks 305, processes/threads 310, libraries 315, dependencies 320, executables 325, and other auxiliary associations of application 300).

Firewalls and Application Control Policies

Figure 4:
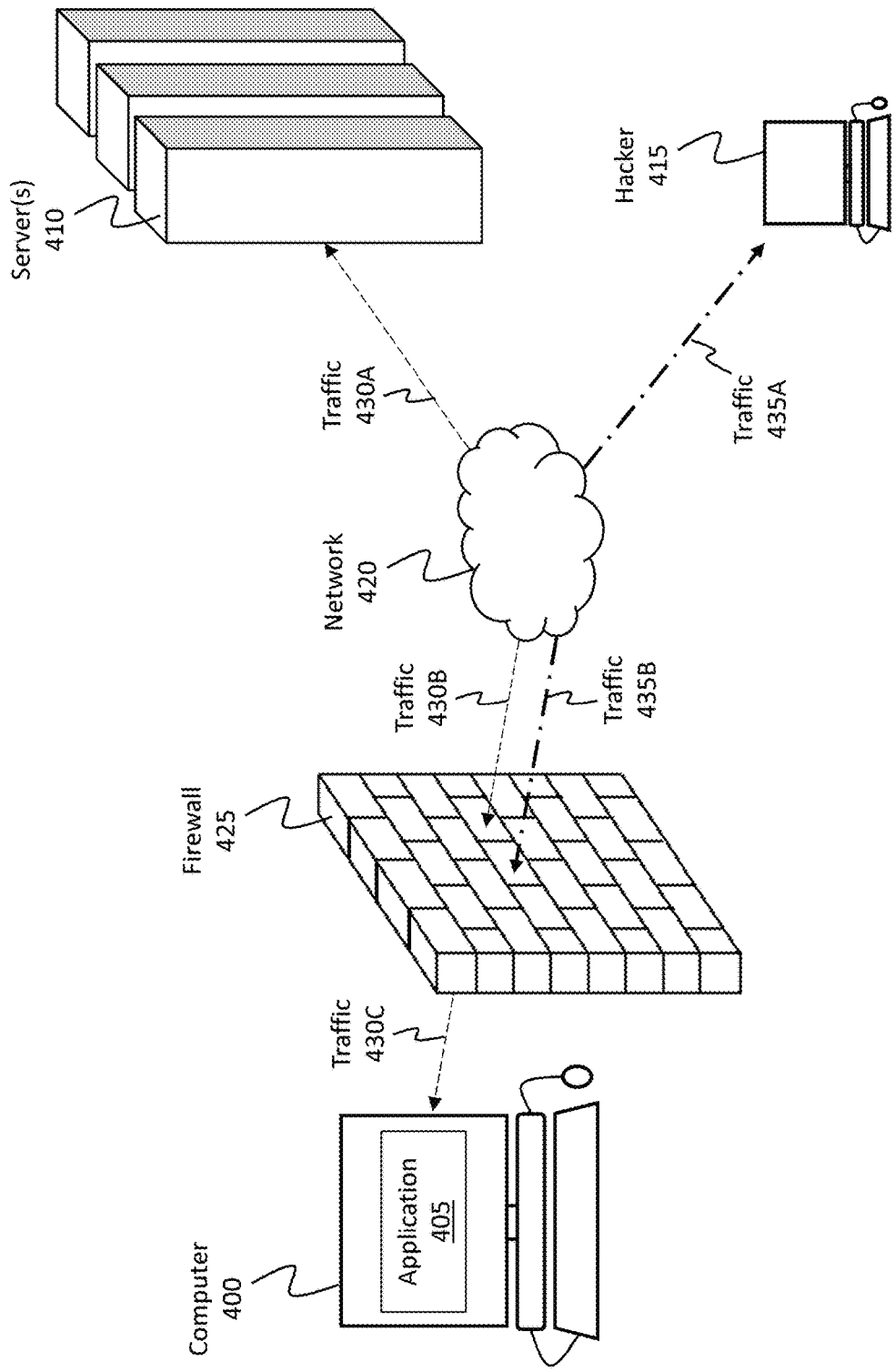
FIG. 4 illustrates how a firewall (i.e. an "application control policy") is able to block certain computing operations (e.g., the receipt or transmission of network traffic) from occurring.

FIG. 4 shows an example scenario in which a firewall is being used to protect a computer. Specifically, FIG. 4 shows a computer 400 and an application 405 executing on computer 400. Computer 400 and application 405 are representative of any of the computer systems and applications discussed thus far. Also shown are a number of servers 410 and a malicious hacker 415. Here, servers 410 and hacker 415 are able to access a network 420. In this example scenario, a firewall 425 is configured to protect computer 400 from the malicious activities of hacker 415 while permitting desired communications with servers 410.

For example, FIG. 4 shows that traffic 430A is being passed to network 420, traffic 430B is being passed from the network 420 to the firewall 425, and traffic 430C is being passed through the firewall 435 to the computer 400. Traffic 430A-C is determined (e.g., by firewall 425) to be allowable traffic such that firewall 425 does not block it. In contrast, consider traffic 435A which is being passed between hacker 415 and network 420, and traffic 435B which is being blocked by firewall 425. By executing its policies, firewall 425 analyzed the attributes of traffic 435A-B and determined that this traffic failed to satisfy the firewall's configuration policies. As such, firewall 425 prevented the traffic originating from hacker 415 (i.e. traffic 435A and 435B) from reaching computer 400 and application 405. In this regard, firewall 425 acts as a protective safeguard for computer 400.

Figure 5:
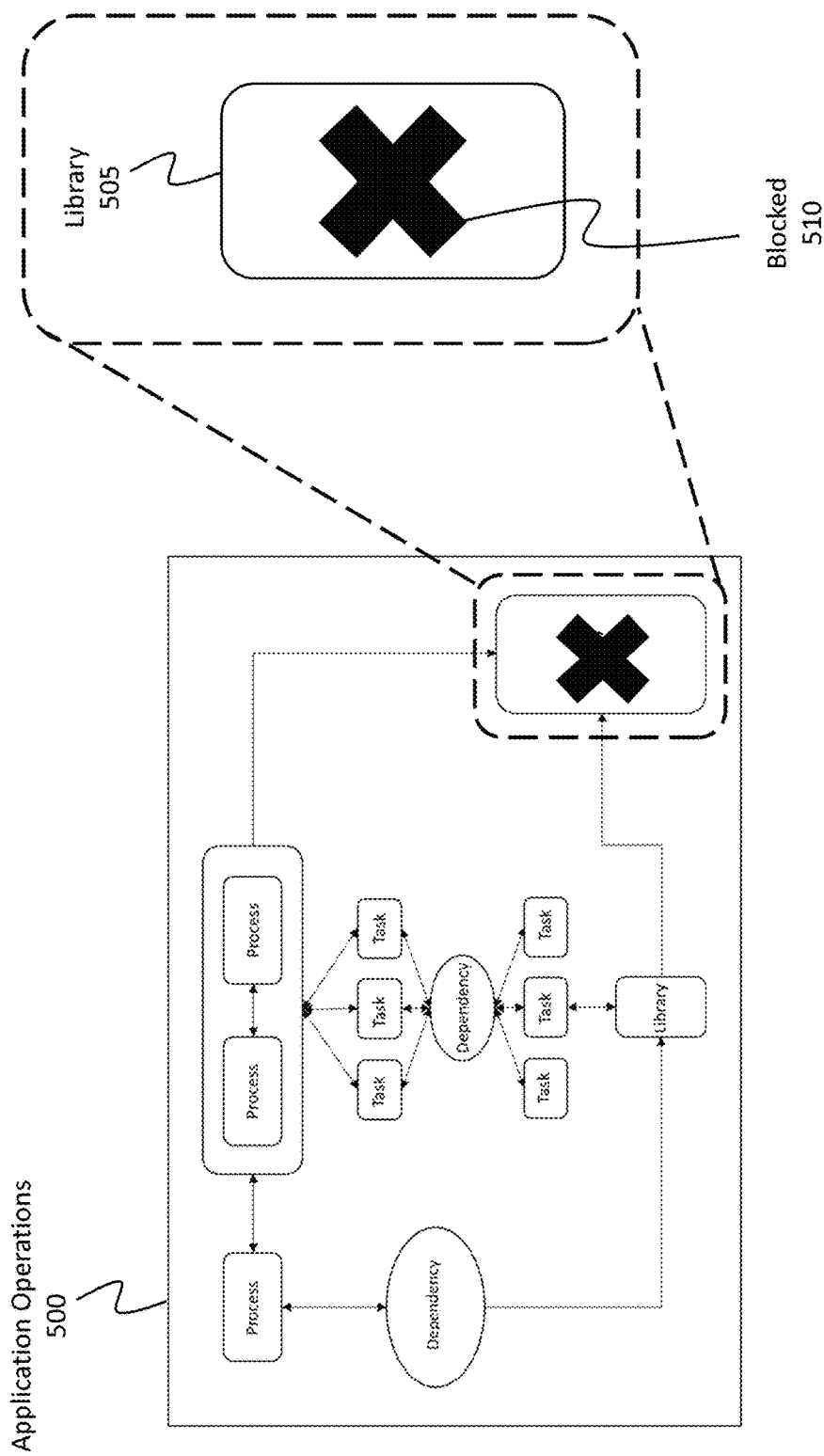
FIG. 5 illustrates an example scenario in which a library associated with an application has been blocked by an application control policy and how that blockage can negatively impact the execution of the application, even to the extent of causing the application to crash or otherwise not function as desired.

While firewalls are very beneficial, in some instances, they can also cause problems, particularly when they block operations of an allowed application. FIG. 5 shows a scenario in which an application is associated with a number of different application operations 500. As described above, application operations 500 may include any number of processes, tasks, libraries, and dependencies. In this example scenario, a library 505, which is included in the application operations 500, was wrongfully blocked 510 by a firewall as a result of an error in the firewall's configuration policy (which error occurred as a result of the problems described earlier). Because the library 505 was included in the application operations 500, there is a high likelihood that the application will now not function as desired. As such, this example scenario shows an instance where the firewall is performing an undesired blocking operation. Such occurrences may happen quite frequently as a result of traditional difficulties with configuring a firewall. The disclosed embodiments improve the technology by providing mechanisms to automatically identify which computing operations are associated with an application (e.g., library 505) and to automatically configure the firewall to permit these operations to occur.

Whitelisting Computing Operations

Figure 6A:
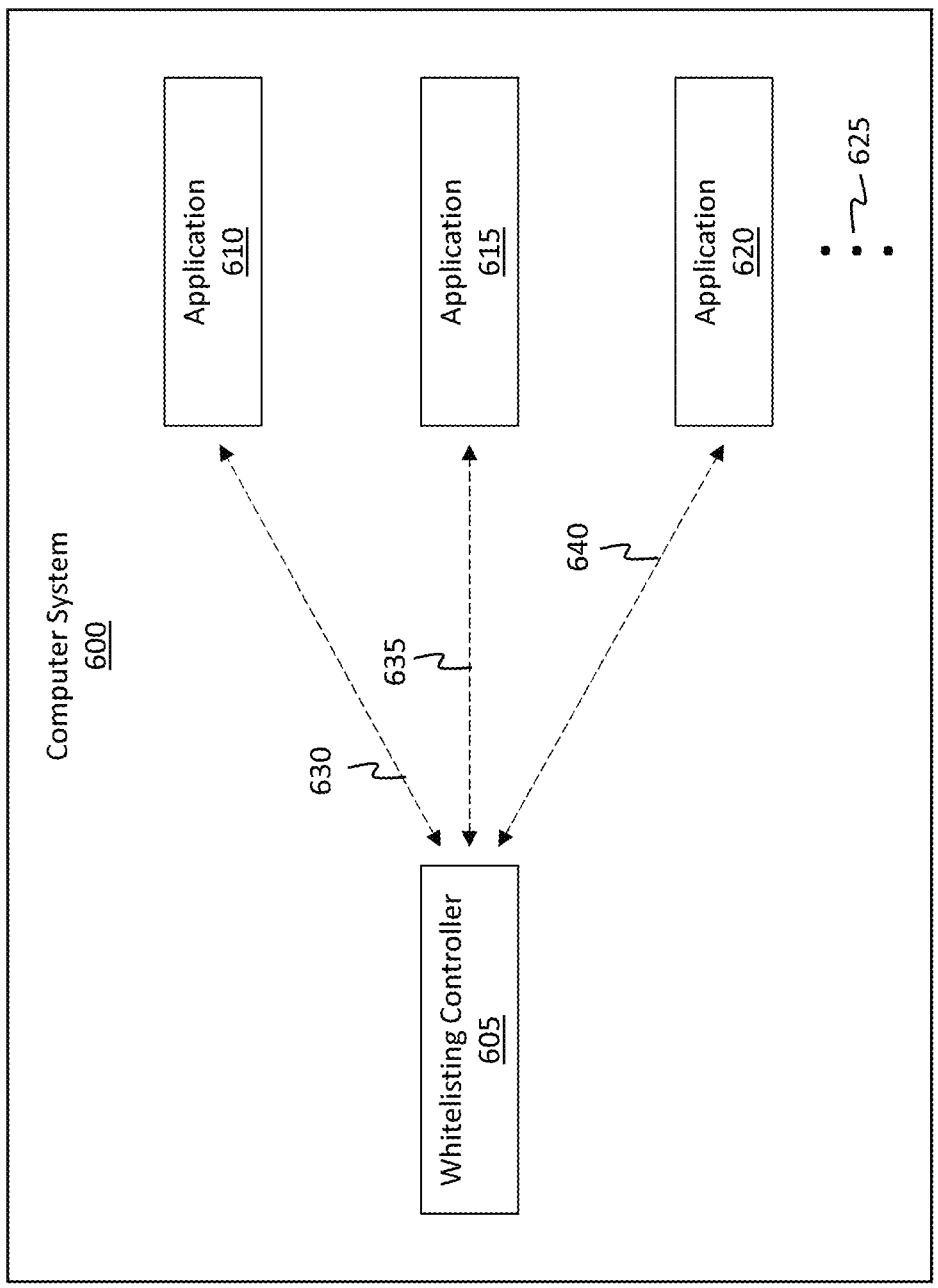
FIGS. 6A and 6B illustrate an example of a whitelisting controller that is able to automatically monitor the computing operations of an application in order to tag those operations in a manner so that the application control policy recognizes those operations as being permissible operations and will refrain from blocking those operations. These figures also show how the whitelisting component can monitor local applications and/or remote applications.
Figure 6B:
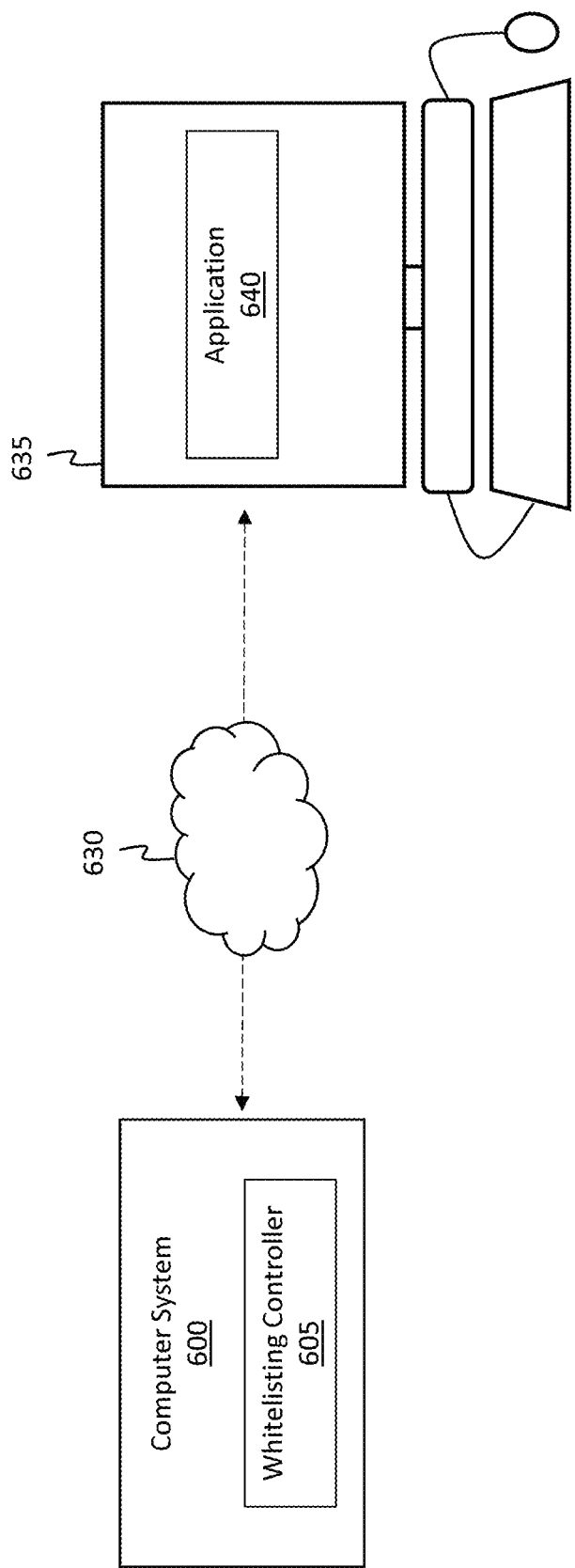

Attention will now be directed to FIGS. 6A and 6B which show how some of the disclosed embodiments are able to automatically configure application control policies to permit an application to execute without impedance or interruption.

FIG. 6A shows a computer system 600, which is representative of any of the computer systems discussed thus far. Also shown is a whitelisting controller 605 and applications 610, 615, and 620. These applications are representative of the applications discussed earlier. The ellipsis 625 demonstrates that any number of applications may be installed on computer system 600.

The arrows 630, 635, and 640 symbolically represent how the whitelisting controller 605 is able to listen, or audit, the computer system as the system executes applications 610, 615, and 620 in order to identify which computing operations correspond to those applications, as described earlier in connection with the methods presented in FIGS. 1A, 1B, and 2. For instance, when a firewall associated with the computer system 600 is temporarily paused from being enforced, the applications 610, 615, and 620 can be executed. During these executions, the whitelisting controller 605 is able to listen, record, and identify which operations are associated with each of these applications by monitoring the machine activity of computer system 600. Thereafter, the whitelisting controller 605 is able to tag or otherwise modify computer system 600's application control policy, for each tagged operation, to ensure that these applications, including their associated computing operations, are permitted to execute.

While FIG. 6A showed a scenario in which applications were installed and were executing locally on the same machine as the whitelisting controller, FIG. 6B shows a different scenario. Specifically, FIG. 6B shows that the whitelisting controller 605 on computer system 600 can also be configured to communicate via a network 630 with one or more remote computer systems 635 that have one or more applications 640 installed thereon. As such, regardless of whether an application is installed locally on a computer system or it is installed on a remote computer system, the whitelisting controller 605 is able to audit that application to detect and record that application's associated computing operations.

Figure 7:
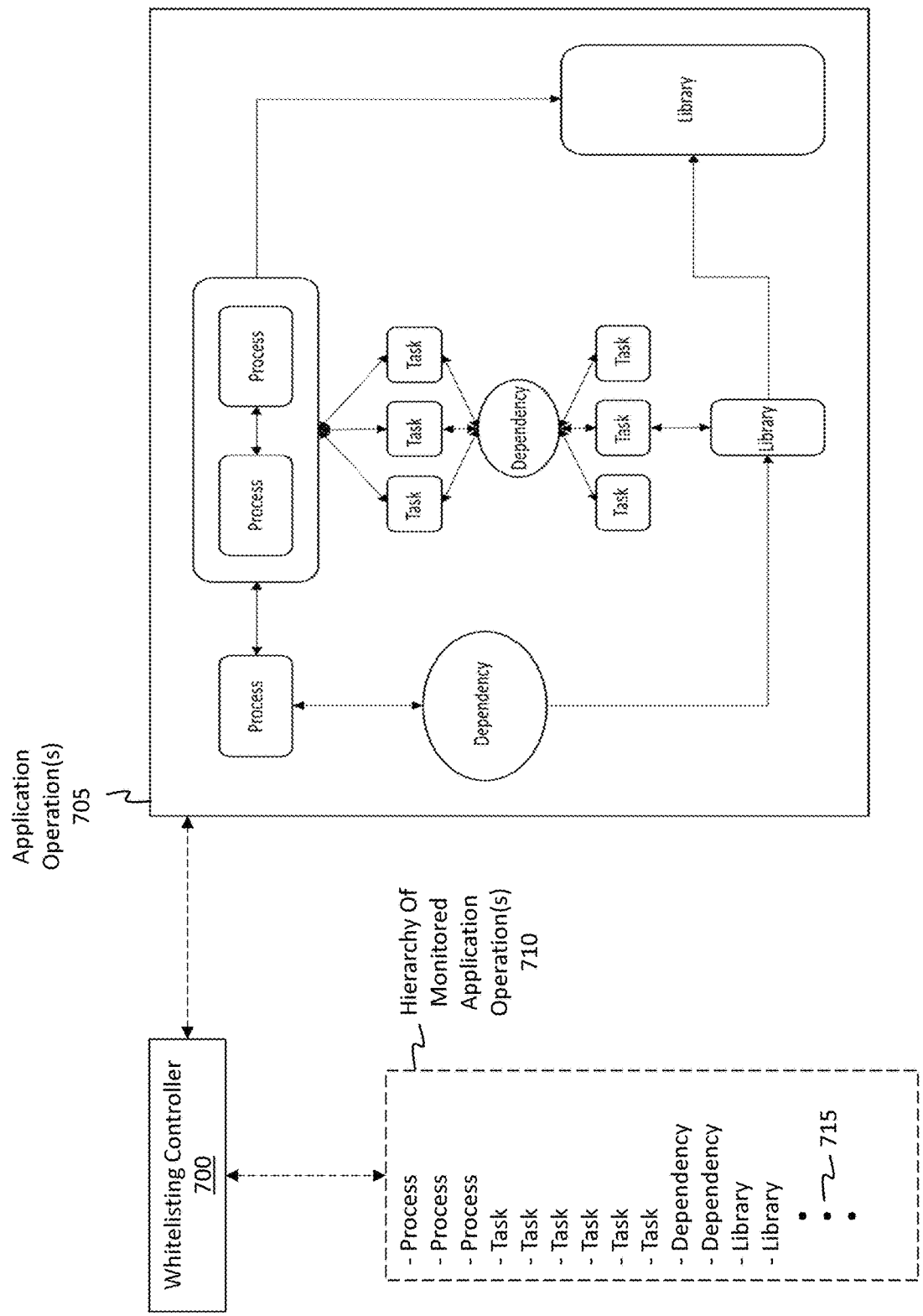
FIG. 7 illustrates how the whitelisting controller is able to monitor and record an application's computing operations and also how the whitelisting controller is able to generate a list or hierarchy of the recorded computing operations.

FIG. 7 more fully shows how the whitelisting controller can audit an application. Specifically, FIG. 7 shows a whitelisting controller 700, which is an example representation of whitelisting controller 605 from FIGS. 6A and 6B. Here, whitelisting controller 700 is listening to an application's operations 705, which are representative of the computing operations described earlier. As shown, whitelisting controller 700 is recording the application's operations 705 and is generating a list or a hierarchy of monitored application operations 710. This hierarchy/list includes the processes, tasks, dependencies, and libraries (ellipsis 715 shows that any number of computing operations may be recorded) of the application's operations 705.

As described earlier, the whitelisting controller 700 performs this monitoring process while the firewall is paused. As such, it is often beneficial to fully exercise an application during this time period in order to identify all (or at least a large majority) of the computing operations/functionalities that are associated with the application. Therefore, in these embodiments, while the application performs the majority of its programmed functionalities, the whitelisting controller 700 (e.g. its audit component) records data about executing threads, executing processes, executing tasks, called libraries, and/or called dependencies. Because of the potentially limited time window in which the firewall is paused, rigorously exercising the application will provide a wealth of information to better configure the firewall. Of course, the time window in which the firewall is disabled (or at least reduced in functionality) is configurable and may be set to last for any selected time period (e.g., seconds, minutes, hours, days, weeks, etc.).

Figure 8:
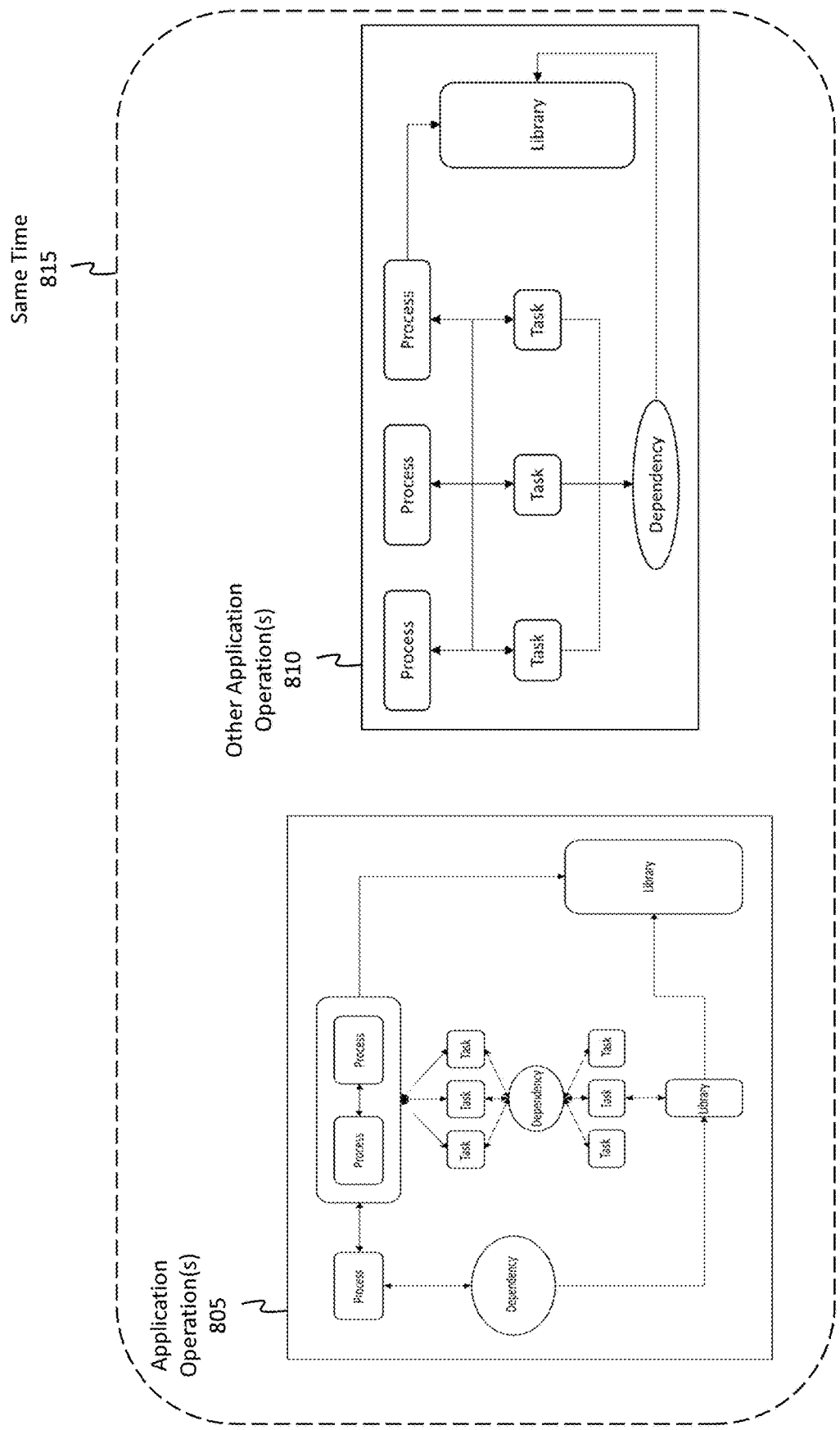
FIG. 8 illustrates how other computing operations (e.g., relating to background applications or other parallel applications) can occur at the same time as the computing operations of a particular application and how it is beneficial to classify and segregate these different types of computing operations.

With reference to the earlier methods, it will be appreciated that the hierarchy of monitored application operations 710 correspond to those computing operations that were included in the first category of operations. FIG. 8, for instance, shows a similar scenario to FIG. 7. Here, however, one application's operations 805 and another application's operations 810 are occurring at the same time 815. As such, the disclosed embodiments are able to segregate or otherwise distinguish these two different types of computing operations.

Additionally, in some implementations, pausing the enforcement of the firewall's application control policies includes pausing the enforcement only for the application's associated computing operations while continuing to enforce the firewall's application control policies for other computing operations that are identified as not being the application's associated computing operations. With reference to FIG. 8, enforcement of the firewall may be paused for application operations 805 while it may still be enforced for other application operations 810.

Figure 9:
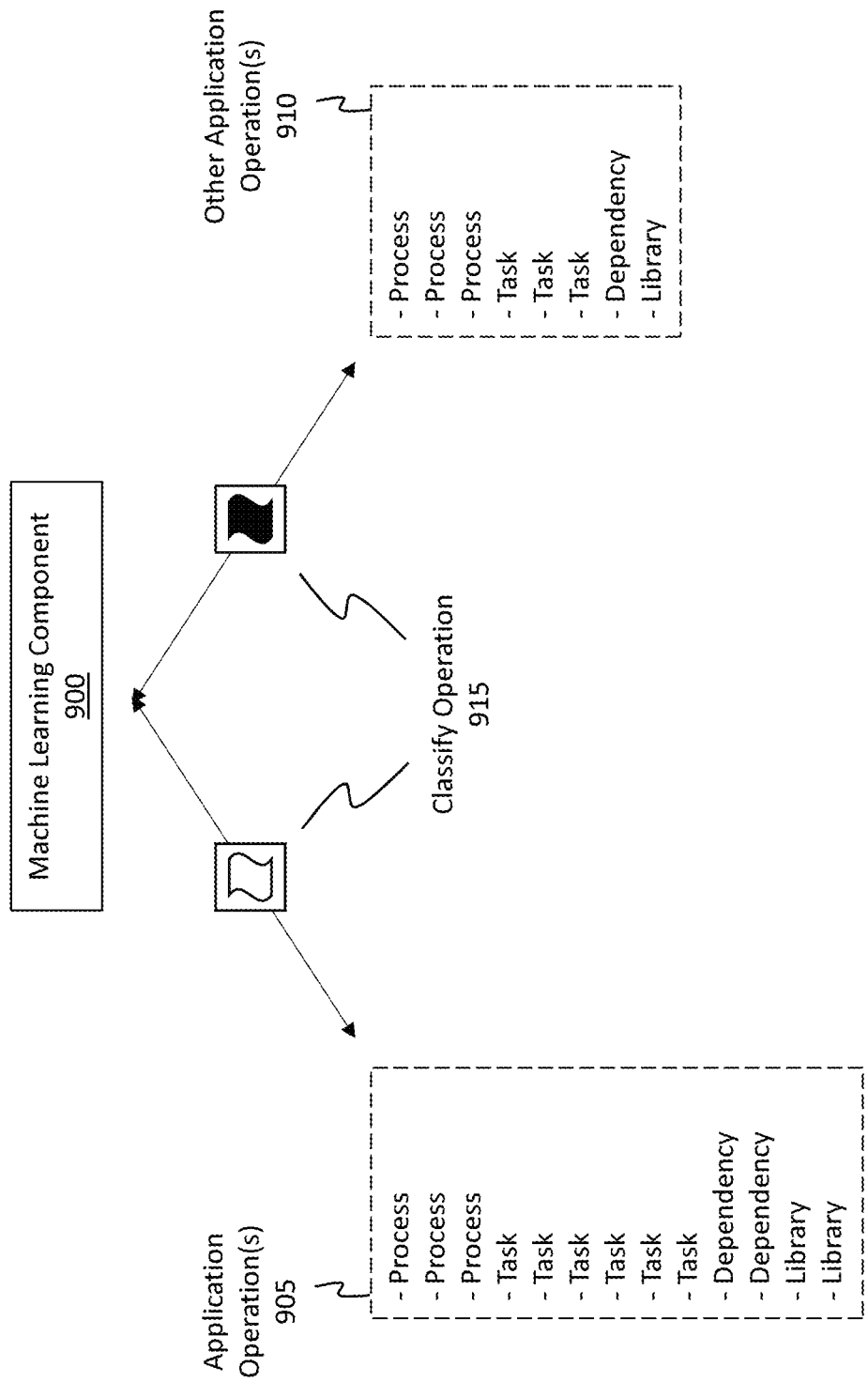
FIG. 9 illustrates a machine learning component capable of identifying which computing operations are associated with which applications.

Such selective enforcement and/or segregation may be achieved in a variety of different ways. FIG. 9 shows a manner in which a machine learning component 900 is used to segregate computing operations. As used herein, a machine learning component (or algorithm) refers to programmatic operations of training a computer system to learn and perform operations in a manner similar to how a human would perform those operations. To do so, the machine learning component/algorithm is fed data, and the algorithm then identifies correlations and other associations present in that data in order to generate computer-created observations and other computer-identified interrelations. From these observations, the algorithm is then applied to other data and makes learned inferences about that other data.

In the current scenario, machine learning component 900 is able to analyze a computer's processing to determine whether the operations associated with that processing correlate to one application or to another application. Machine learning component 900 of FIG. 9 is generating two different listings of operations (e.g., application operations 905 and other application operations 910) by performing a classification operation 915. With reference to FIG. 8, machine learning component 900 can generate a listing for application operations 805 and a separate listing for other application operations 810.

The process of classifying and segregating computing operations may be performed in a variety of different manners. For instance, machine learning component 900 can analyze metadata associated with an operation, it can identify information about individual threads, it can identify which entities spawned the work unit, it can identify which entities are depending on a particular work unit, or it can perform any other operation to determine which computing operations are associated with which applications. In this regard, a machine learning algorithm can be used to scan the recorded computing operations and to classify the recorded computing operations into the two categories discussed earlier. Alternatively, some embodiments perform these operations themselves as opposed to relying on a specific type of machine learning algorithm/component.

Figure 10:
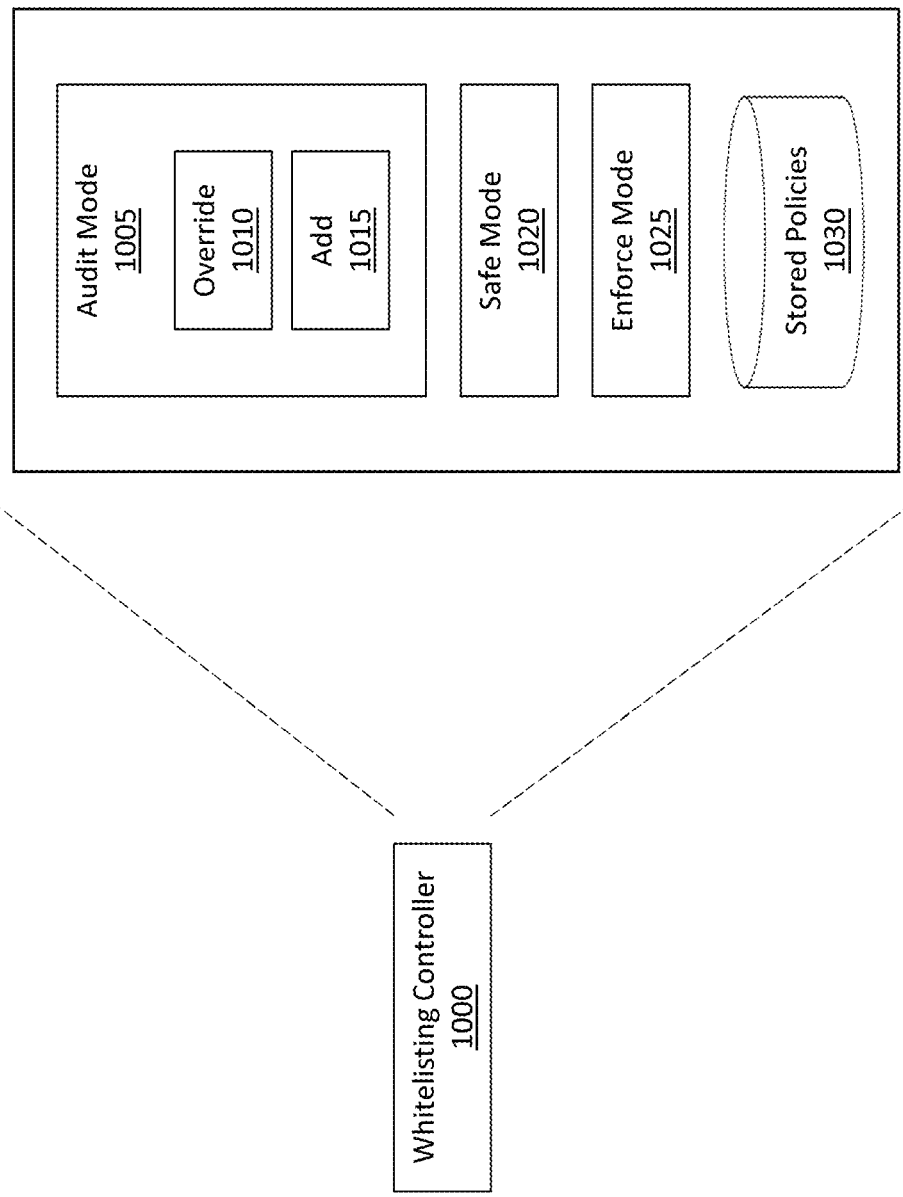
FIG. 10 illustrates how the whitelisting controller is associated with different modes and stored policies.

FIG. 10 more fully illustrates some of the attributes or characteristics of a whitelisting controller 1000, which is representative of any of the earlier whitelisting controllers discussed thus far. Whitelisting controller 1000 includes an audit mode 1005, which may include an override component 1010 and/or an add component 1015. Whitelisting controller 1000 also includes a safe mode 1020, an enforce mode 1025, and stored policies 1030 (e.g., policy data generated from auditing computing operations, where the policy data will then be injected into the firewall's configuration policy).

Audit mode 1005 corresponds to situations in which the whitelisting controller 1000 causes the firewall to be temporarily paused and causes an application to be exercised. While in this mode, the whitelisting controller 1000 records the application's computing operations, as described earlier, and can augment or otherwise incorporate policy data for those operations into the firewall's policy configuration data by tagging the operations as being safe and/or by updating the policy configuration data. In this manner, the whitelisting controller 1000, when in the audit mode 1005, may use an audit component (to be discussed later in connection with FIG. 14) to record computing operations in order to record data about executing threads, executing processes, executing tasks, called libraries, and called dependencies.

One manner of modifying/incorporating policy data into the firewall's policy is via use of the override component 1010. In many situations, the firewall already includes existing policy. As an example, consider an email application that is running on a computer. Here, the firewall is probably already configured to allow this email application to fetch email from an email server and to perform other operations. It might be the case, however, that a new email application is to replace the old email application. As such, it will be beneficial to delete the old email's corresponding policy information included in the firewall and replace (i.e. "override") it with new policy information for the new email application. In this regard, the override component 1010 is able to remove and replace existing policy data with new policy data.

In contrast to removing and replacing policy data, the add component 1015 is configured to supplement, augment, or otherwise add policy data to the firewall. Stated differently, the add component 1015 does not remove existing data from the firewall, but rather simply adds to it by incorporating new policy data.

With reference to the two categories that were mentioned earlier, causing the computing operations of the first category to be "whitelisted" may include one or more of the following: (1) adding policy data for the computing operations of the first category to the firewall's policy (e.g., the white list of permissible operations) such that the policy data supplements other policy data for one or more other computing operations in the firewall's policy, and/or (2) deleting the other policy data for the one or more other computing operations from the firewall's policy and replacing the deleted other policy data with the policy data for the computing operations of the first category.

Figure 11:
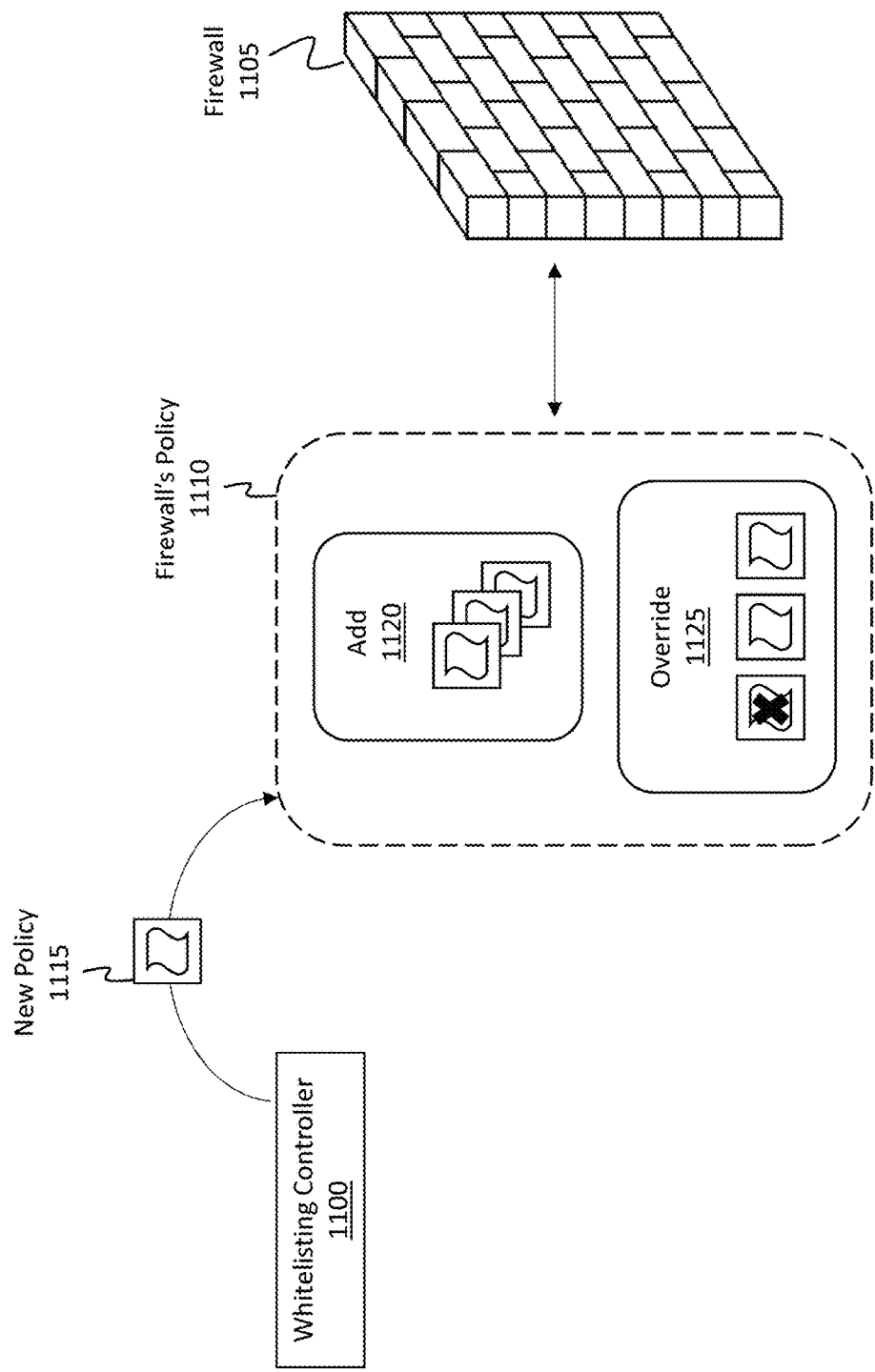
FIG. 11 illustrates how the whitelisting controller is able to incorporate (e.g., add, override, etc.) new policy into application control policy.

Turning briefly to FIG. 11, this figure more fully illustrates the operations associated with the override component 1010 and the add component 1015. Specifically, FIG. 11 shows a whitelisting controller 1100, a firewall 1105, and firewall policy 1110 that is associated with the firewall 1105. In this scenario, whitelisting controller 1100 is injecting new policy 1115 into the firewall's policy 1110, which comprises or includes a whitelist of permissible operations/applications. This injection process can include adding 1120 new policy to the existing policy so as to supplement the existing policy or, alternatively, overriding 1125 the existing policy by deleting one or more portions of the existing policy and replacing the deleted portions with the new policy 1115.

Returning to FIG. 10, in addition to audit mode 1005, whitelisting controller 1000 is able to operate in a safe mode 1020. After the application has been exercised and its computing operations were recorded, the firewall is again enforced and only "allowed" processes are permitted to execute. Although rare, there may be situations in which one or more of the application's computing operations were not performed (and thus audited) during the time period in which the firewall was disabled. If those computing operations were not already tagged as being permissible, then they will be obstructed by the firewall once it is again enforced.

Therefore, the disclosed embodiments may utilize safe mode 1020. While this mode is enabled, operations that are associated with a permitted application but that were not previously tagged as being allowed, are not forthrightly (or rather permanently) obstructed. Instead, a number of different actions may be triggered upon such a condition.

One action that may occur is the issuance of a notification to a system administrator, where the notification indicates that a particular computing operation was not previously flagged as being permissible but that it should be flagged as a result of it being associated with the application of interest. Here, the system administrator can elect to allow or deny the operation, and, based on his/her election, the computing operation can be automatically tagged or permitted in any of the manners described earlier.

Another operation is to forgo notifying the system administrator via a interruptive/formalized notification, and instead flag the computing operation as permissible automatically. In such a scenario, the automatic flagging process can be recorded in a system log for later inspection, as desired.

Figure 12:
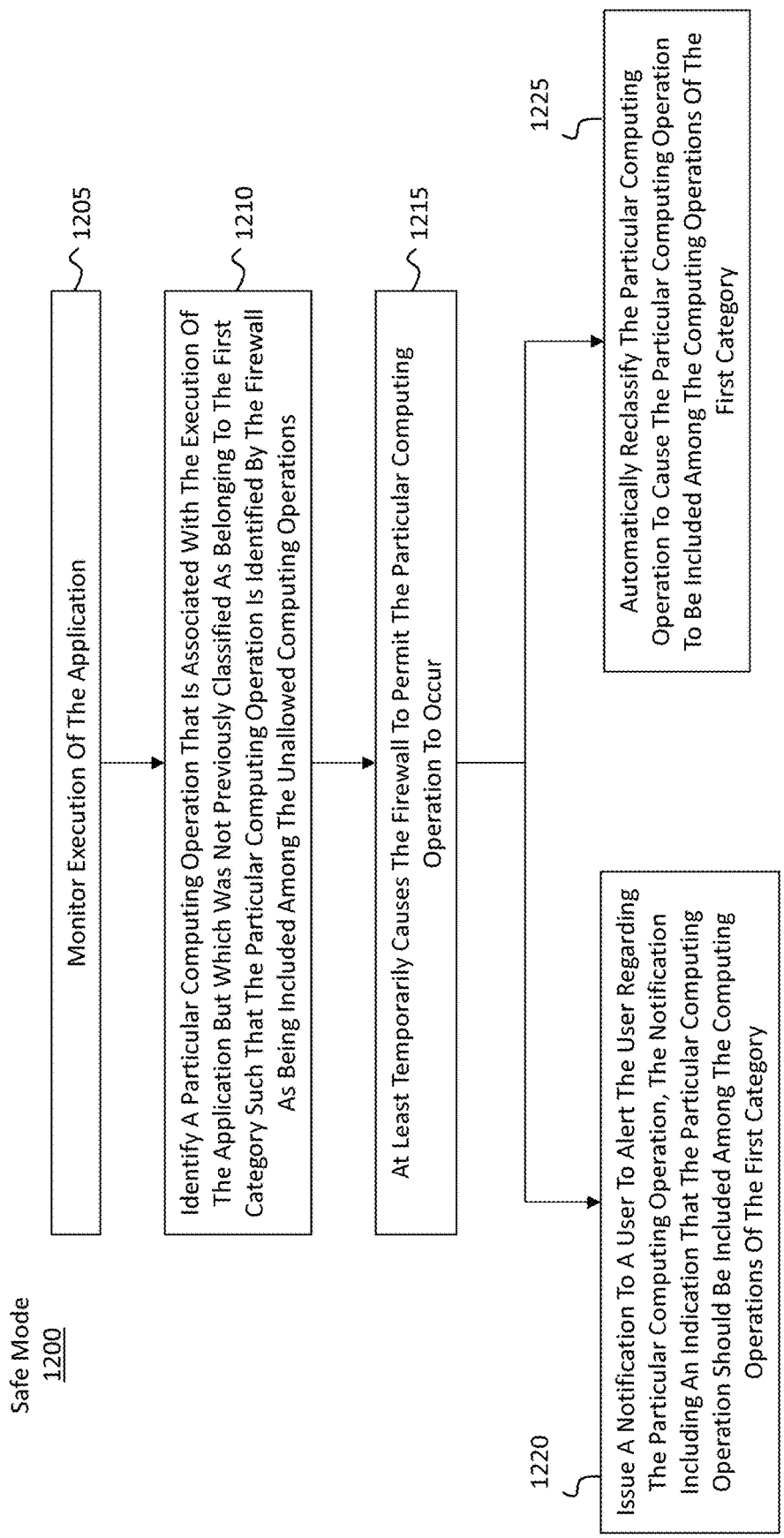
FIG. 12 illustrates some of the operations that can occur when the whitelisting controller causes a safe mode to be implemented.

Turning briefly to FIG. 12, here there is shown a few example processes that may be performed while a safe mode 1200 is enabled. It will be appreciated that these operations are typically performed after the computing operations of the first category are whitelisted and after the computer system has again started to enforce the firewall to block unallowed computing operations.

Here, the whitelisting controller determines that safe mode 1200 is to be enabled for a determined period of time. Further details on these time periods are provided below. While the safe mode 1200 is enabled, the whitelisting component (e.g., its audit component) monitors execution of the application (act 1205).

Next, a particular computing operation that is associated with the execution of the application but which was not previously classified as belonging to the first category is identified (act 1210). In this regard, the particular computing operation is identified by the firewall as being included among the "unallowed" computing operations.

Next, the firewall is configured to temporarily permit the particular computing operation to occur (act 1215). Subsequently, one or more of the following operations may occur. In a first operation, a notification is issued to a user of the computer system to alert the user regarding the particular computing operation (act 122), as described above. In some cases, the notification includes an indication that the particular computing operation should be included among the computing operations of the first category. In another operation, the particular computing operation is automatically reclassified to cause the particular computing operation to be included among the computing operations of the first category (act 1225). Reclassifying the particular computing operation additionally causes the firewall to identify the particular computing operation as one of the allowed computing operations.

Accordingly, while the safe mode 1020 of FIG. 10 is enabled, an application can continue to operate unimpededly even if one or some of its computing operations were not previously flagged as being permissible. It will be appreciated that the safe mode 1020 may occur for a fixed period (e.g., a selected number of seconds, minutes, hours, days, or even weeks) or for a renewable period where the renewal period is triggered or renewed upon the occurrence of one or more conditions. In this regard, the period of time can be adjustable.

Examples of renewing triggering conditions include, but are not limited to, one or more detected attributes or characteristics of the computer system. For example, a determination can be made as to whether the computer system has been subject to a certain number of hacking attempts within a recent/pre-selected time period. If so, then it may be advantageous to renew the renewable time period to more fully scrutinize computing operations that are denied but requesting access. Another renewing triggering condition may relate to how frequently other computing operations that are in fact associated with the application are identified during the time period. For example, if a sufficiently high number (or some threshold number) of previously-undetected computing operations are identified, it may suggest that the application was not exercised as rigorously or as long as it should have been. As such, it will be beneficial to prolong the period of time so as to "catch" these previously undetected computing operations. Any other detectable condition that may be relevant in determining whether to extend or renew the time period may also be used.

Regarding the enforce mode 1025, this mode relates to situations in which a computer's firewall or other type of application control policies are fully enabled and are not being restricted by the whitelisting controller 1000. Regarding the stored policies 1030, these relate to policy information that is derived or otherwise created for the identified computing operations associated with the application of interest. Policy data included in the stored policies 1030 can be selectively incorporated (e.g., via the override component 1010 or the add component 1015) into a firewall's configuration policy to ensure that the application will be able to operate without obstruction. In this regard, the whitelisting controller 1000 can maintain or otherwise be associated with a database that is used to store the stored policies 1030.

Figure 13:
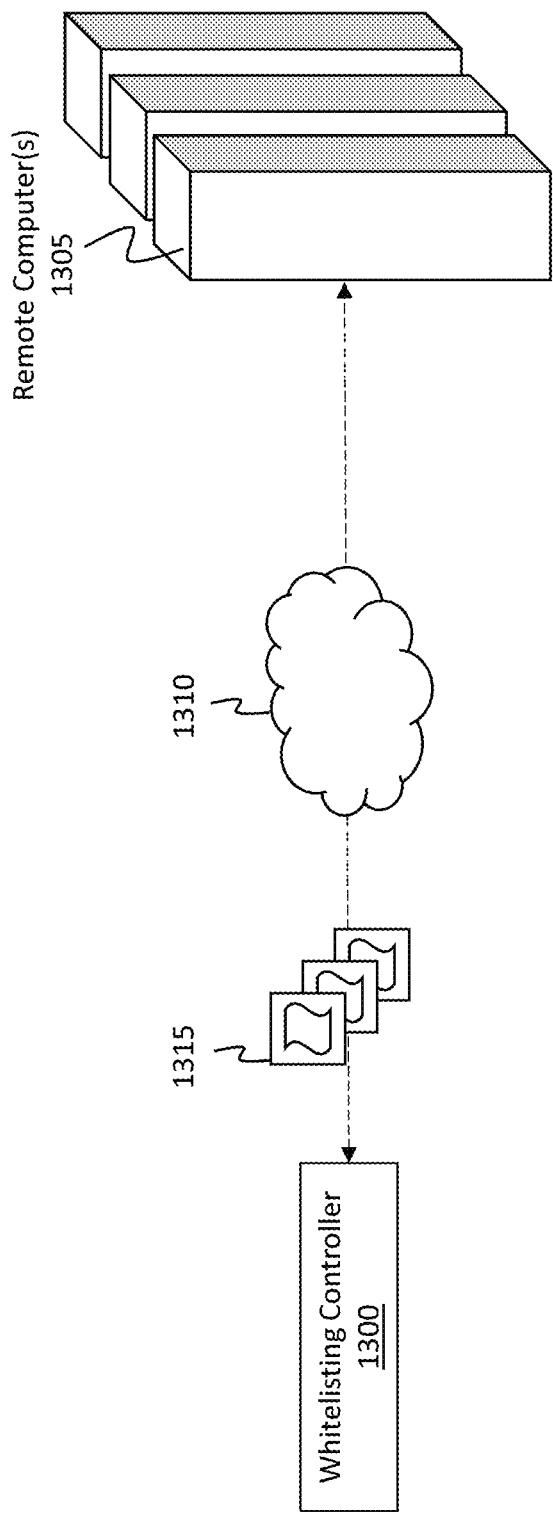
FIG. 13 illustrates how the whitelisting controller is able to instruct remote computing systems, which are configured in a particular manner, to accept and adopt a particular policy configuration scheme in order to implement a global configuration.

Attention will now be directed to FIG. 13 which shows a scenario in which a global configuration process can be performed in order to quickly configure multiple similarly-configured computers. FIG. 13 shows a whitelisting controller 1300, any number of remote computers 1305, and a network connection 1310. In this scenario, the whitelisting controller 1300 has configured a particular computer (and its firewall) in the manners described earlier (e.g., the methods in FIGS. 1A, 1B, and/or 2). In many situations, other computers (e.g., remote computers 1305) may have a configuration that is similar to the computer that was just configured by whitelisting controller 1300 prior to its new configuration (e.g., similar hardware platforms, similar firewall settings, etc.). Furthermore, these remote computers 1305 may also be executing the same application.

In such scenarios, it is highly beneficial to utilize a global configuration technique. Because all of these computers are configured similarly, the disclosed embodiments are able to package the policy information that was used on the original computer (i.e. policy information 1315) and transmit it to the remote computers 1305.

Stated differently, policy information of the computing operations of the first category (i.e. policy information 1315) may be transmitted to one or more remote computer systems 1305, where these remote computer systems 1305 have a same configuration as the original computer system. Additionally, an instruction can be transmitted to these remote computer systems 1305 to instruct them that they are to add the transmitted policy information 1315 to their firewalls so that the application of interest can also be whitelisted on these remote computer systems 1305, thereby resulting in a global configuration.

In this regard, a single machine's policy can be updated or, alternatively, a group of machines can be simultaneously updated via a batch update instruction. It will be appreciated that determining which machines will be included in this batch/global update can be selected manually by a system administrator, selected automatically as a result of certain machines being included in the same resource group or domain, and/or selected automatically as a result of a recommendation submitted by an artificial intelligence engine or other type of machine learning component.

Accordingly, the disclosed embodiments bring about many advantages by automatically identifying which computing operations are associated with which applications. The embodiments also whitelist a particular application's associated computing operations in order to ensure that they will not be blocked by a firewall or other type of application control policy. Such processes provide a highly efficient and flexible technique for configuring firewalls.

Example Computer Systems

Figure 14:
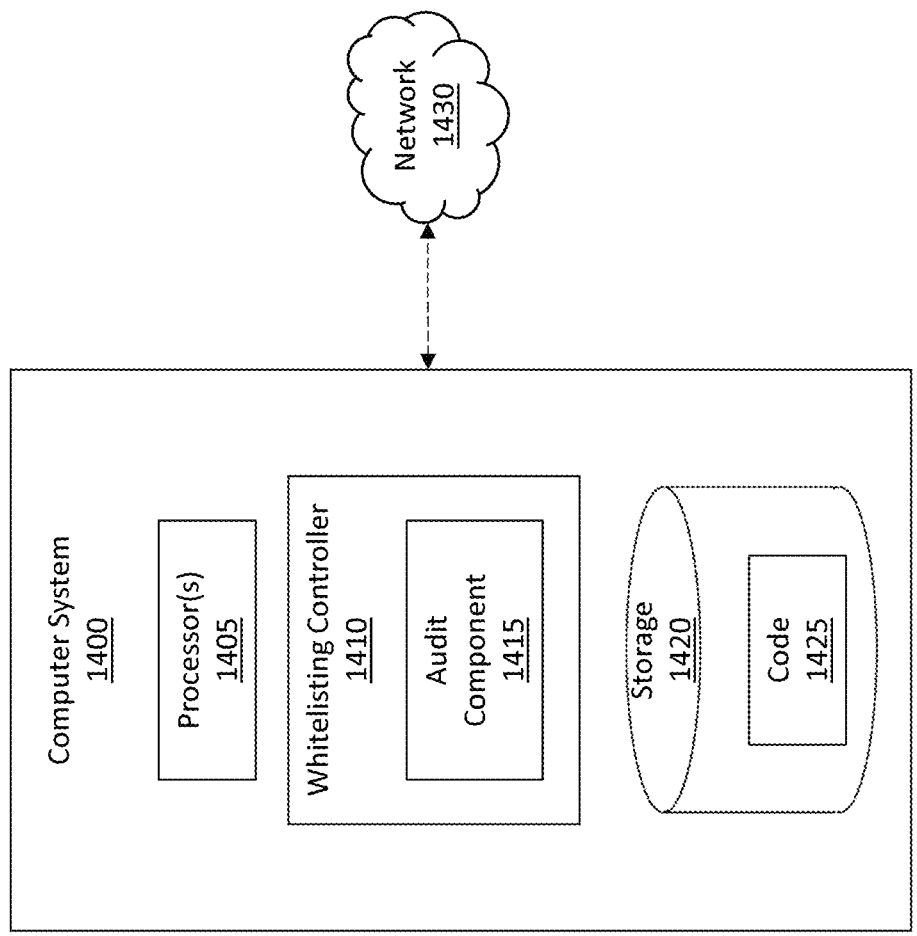
FIG. 14 illustrates an example computer system capable of performing any of the disclosed operations.

Attention will now be directed to FIG. 14 which illustrates an example computer system 1400 that may be used to facilitate the operations described herein. Computer system 1400 may take various different forms. For example, computer system 1400 may be embodied as a tablet, a desktop, a distributed system that includes one or more connected computing components/devices that are in communication with computer system 1400, a laptop computer, a mobile phone, a server, a data center, and/or any other computer system.

In its most basic configuration, computer system 1400 includes various different components. For example, FIG. 14 shows that computer system 1400 includes at least one processor 1405 (aka a "hardware processing unit"), a whitelisting controller 1410 (including an audit component 1415 which may be a specialized component or processor configured to perform any of the disclosed operations), wherein the whitelisting controller 1410 may also be a specialized processor, and storage 1420. Additionally, processor 1405 and/or whitelisting controller 1410 may be configured to perform any of the operations discussed herein. Storage 1420 is shown as including executable code/instructions 1425 that are executable to cause the computer system 1400 to perform the disclosed operations.

Storage 1420 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well. As used herein, the term "executable module," "executable component," or even "component" can refer to software objects, routines, or methods that may be executed on computer system 1400. The different components, modules, engines, and services described herein may be implemented as objects or processors that execute on computer system 1400 (e.g. as separate threads).

The disclosed embodiments may comprise or utilize a special-purpose or general-purpose computer including computer hardware, such as, for example, one or more processors (such as processor 1405) and system memory (such as storage 1420), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras, accelerometers, gyroscopes, acoustic sensors, magnetometers, etc.). Further, computer system 1400 may also be connected through one or more wired or wireless networks 1430 to remote systems(s) that are configured to perform any of the processing described with regard to computer system 1400. A graphics rendering engine may also be configured, with processor 1405, to render one or more user interfaces to a user on a display associated with the computer system 1400.

A "network," like the network 1430 shown in FIG. 14, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1430. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1405). For example, and without limitation, illustrative types of hardware logic components that can be used include Field-Programmable Gate Arrays (FPGAs), Program-Specific or Application-Specific Integrated Circuits (ASIC s), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
  one or more processors; and
  one or more computer-readable hardware storage devices having stored thereon computer-executable instructions that are executable by the one or more processors to configure the computer system to:
  trigger initialization and execution of an application;
  concurrently with the initialization and execution of the application, cause an audit component to record computing operations that occur while the application is being initialized and executed;
  concurrently with the initialization and execution of the application, cause the computer system to pause enforcement of a firewall that is configured to block unallowed computing operations that are identified as failing to satisfy a configuration policy of the firewall;
  classify the recorded computing operations into at least two categories, the at least two categories including a first category of computing operations that are associated with the application being initialized and executed and a second category of computing operations that are not associated with the application being initialized and executed but that occurred concurrently with the computing operations of the first category;
  after the computing operations of the first category are classified, cause the computing operations of the first category to be whitelisted such that the computing operations of the first category are tagged as being allowed computing operations that are identified as satisfying the configuration policy of the firewall;
  after the computing operations of the first category are whitelisted, cause the computer system to enforce the firewall to again block the unallowed computing operations;
  cause a safe mode to be implemented for a determined period of time, wherein, while the safe mode is implemented, the audit component:
  monitors execution of the application;
  identifies a particular computing operation that is associated with the execution of the application but which was not previously classified as belonging to the first category such that the particular computing operation is identified by the firewall as being included among the unallowed computing operations; and
  at least temporarily causes the firewall to permit the particular computing operation to occur.

2. The computer system of claim 1, wherein the application is installed on the computer system or, alternatively, the application is installed on a remote computer system.

3. The computer system of claim 1, wherein execution of the application includes exercising the application to cause the application to perform at least a majority of its programmed functionalities, and wherein, while the application performs the at least the majority of its programmed functionalities, the audit component records data about executing threads, executing processes, executing tasks, called libraries, and/or called dependencies.

4. The computer system of claim 1, wherein the computing operations of the first category are listed in an application hierarchy associated with the application.

5. The computer system of claim 1, wherein a machine learning algorithm scans the recorded computing operations and classifies the recorded computing operations into at least the two categories.

6. The computer system of claim 1, wherein causing the audit component to record the computing operations that occur while the application is being initialized and executed includes recording data about executing threads, executing processes, executing tasks, called libraries, and called dependencies.

7. The computer system of claim 1, wherein causing the computing operations of the first category to be whitelisted includes one of the following:
  adding policy data for the computing operations of the first category to the firewall's policy such that the policy data supplements other policy data for one or more other computing operations in the firewall's policy; or
  deleting the other policy data for the one or more other computing operations from the firewall's policy and replacing the deleted other policy data with the policy data for the computing operations of the first category.

8. The computer system of claim 1, wherein execution of the computer-executable instructions further configures the computer system to perform one or more of the following:
  issue a notification to a user of the computer system to alert the user regarding the particular computing operation, the notification including an indication that the particular computing operation should be included among the computing operations of the first category; or
  automatically reclassify the particular computing operation to cause the particular computing operation to be included among the computing operations of the first category, wherein reclassifying the particular computing operation additionally causes the firewall to identify the particular computing operation as one of the allowed computing operations.

9. The computer system of claim 1, wherein the application is initialized and executed on the computer system, and wherein execution of the computer-executable instructions further configures the computer system to:
  transmit policy information of the computing operations of the first category to one or more remote computer systems, the one or more remote computer systems having a same configuration as the computer system; and instruct the one or more remote computer systems to add the transmitted policy information to their firewalls to cause the application to also be whitelisted on the one or more remote computer systems.

10. A method for automatically configuring application control policies to permit an application, including its associated computing operations, to execute on a computer system, the method being implemented by the computer system and comprising:

after installing the application on the computer system, executing the application on the computer system in an audit mode;

while the application is executing in the audit mode, temporarily pausing enforcement of a firewall that is configured to block unallowed computing operations that are identified as failing to satisfy one or more application control policies of the firewall;

recording the application's associated computing operations while the enforcement of the firewall is temporarily paused in the audit mode;

including policy data for the application's associated computing operations into the one or more application control policies of the firewall while the enforcement of the firewall remains temporarily paused in the audit mode, and such that the application's associated computing operations are identified as being permissible operations and are refrained from being blocked during enforcement of the firewall and corresponding one or more application control policies of the firewall; and after the policy data for the application's associated computing operations are included in the one or more application control policies, switching execution of the application from the audit mode to a safe mode for a predetermined period of time, during which enforcement of the firewall is at least partially resumed and during which a detected operation of the application that was not included in the policy data is identified and triggers at least one of (1) a further update to the one or more application control policies of the firewall based on the detected operation or (2) a notification of the detected operation to an administrator for requesting input on updating or refraining from updating the one or more application control policies of the firewall based on the detected operation;

subsequent to the predetermined period of time elapsing, switching from the safe mode to an enforcement mode for resuming enforcement of the firewall and all of the one or more application control policies of the firewall that are now updated with the policy data and the detected operation.

11. The method of claim 10, wherein recording the computing operations includes recording information about executing threads, executing processes, executing tasks, called libraries, and/or called dependencies.

12. The method of claim 10, wherein pausing the enforcement includes pausing the enforcement of the one or more application control policies only for the application's associated computing operations while enforcing the one or more application control policies for other computing operations that are identified as not being the application's associated computing operations.

13. The method of claim 10, wherein the method further comprises:

updating the one or more application control policies of the firewall based on the detected operation while in the safe mode.

14. The method of claim 13, wherein the computer system operates in the safe mode for the predetermined period of time, which is a renewable time period in which the renewable time period renews upon an occurrence of a particular triggering condition.

15. The method of claim 13, wherein the predetermined period of time is adjustable depending on one or more attributes of the computer system.

16. The method of claim 10, wherein a machine learning algorithm segregates computing operations that are determined to be the application's associated computing operations from computing operations that are not associated with the execution of the application but that occur concurrently with the execution of the application.

17. One or more hardware storage devices having stored thereon computer-executable instructions that are executable by one or more processors of a computer system to thereby configure the computer system to:

trigger initialization and execution of an application;

concurrently with the initialization and execution of the application, cause an audit component to record computing operations that occur while the application is being initialized and executed;

concurrently with the initialization and execution of the application, cause the computer system to monitor the application in an audit mode and by pausing enforcement of a firewall that is configured to block unallowed computing operations that are identified as failing to satisfy a configuration policy of the firewall;

while monitoring the application in the audit mode, classify the recorded computing operations into at least two categories, the at least two categories including a first category of computing operations that are associated with the application being initialized and executed and a second category of computing operations that are not associated with the application being initialized and executed but that occurred concurrently with the computing operations included in the first category;

after the computing operations of the first category are classified in the audit mode, incorporate policy data for the computing operations of the first category into the firewall's configuration policy to cause the firewall to permit the computing operations of the first category when the firewall is enforced; and switch from monitoring of the application in the audit mode to monitoring the application in a safe mode, during which the firewall configuration policy is partially enforced and during which a detected operation of the application is detected by the computer system monitoring the application in the safe mode, which was not classified in the audit mode, and which is used to update the firewall configuration policy while in the audit mode.

18. The one or more hardware storage devices of claim 17, wherein the application is initialized and executed in a cloud computing environment.

19. The one or more hardware storage devices of claim 17, wherein the computing operations of the first category are listed in an application hierarchy associated with the application.

20. The one or more hardware storage devices of claim 17, wherein the computer-executable instructions are further executable to configure the computer system to switch from monitoring of the application in the safe mode to monitoring the application in an enforcement mode during which all detected operations of the application that are not designated as safe by the firewall configuration policy are prevented from being executed.

* * * * *